US007751336B2

(12) United States Patent
Hopps et al.

(10) Patent No.: US 7,751,336 B2
(45) Date of Patent: Jul. 6, 2010

(54) TECHNIQUE FOR EFFICIENTLY AVOIDING TRANSIENT ROUTING DISTURBANCES IN LINK STATE ROUTING PROTOCOLS WITH LINK STATE PACKET FRAGMENTATION

(75) Inventors: Christian Hopps, San Francisco, CA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 11/449,282

(22) Filed: Jun. 8, 2006

(65) Prior Publication Data
US 2007/0286091 A1 Dec. 13, 2007

(51) Int. Cl.
*H04J 1/16* (2006.01)
(52) U.S. Cl. ................ 370/248; 370/242; 370/252; 370/392
(58) Field of Classification Search ................ 370/244, 370/238, 248
See application file for complete search history.

(56) References Cited

U.S. PATENT DOCUMENTS

| 5,128,926 | A  | * | 7/1992  | Perlman et al. ......... 370/248 |
|-----------|----|---|---------|---------------------------------|
| 6,215,764 | B1 | * | 4/2001  | Wey et al. .............. 370/216 |
| 6,453,357 | B1 |   | 9/2002  | Crow et al.                     |
| 6,775,709 | B1 | * | 8/2004  | Elliott ................. 709/238 |
| 6,898,187 | B2 | * | 5/2005  | Perlman et al. ......... 370/252 |
| 7,039,914 | B2 |   | 5/2006  | Potter                          |
| 7,042,850 | B2 | * | 5/2006  | Stewart ................ 370/254 |
| 7,058,016 | B1 |   | 6/2006  | Harper                          |
| 7,239,613 | B1 | * | 7/2007  | Canning et al. ......... 370/254 |
| 7,391,741 | B2 | * | 6/2008  | Kang .................. 370/254 |
| 2002/0161915 | A1 |   | 10/2002 | Crow et al.                   |
| 2005/0117593 | A1 | * | 6/2005  | Shand ................. 370/401 |
| 2006/0062253 | A1 |   | 3/2006  | Chinnaiah et al.              |

FOREIGN PATENT DOCUMENTS

EP 0447725 A2 * 9/1991

OTHER PUBLICATIONS

Hermelin;"Extending The Number of LSP Fragments Beyond the 256 Limit"; 2001 Network Working Group; p. 1-7.*

Perlman, Radia, Interconnections Second Edition: Bridges, Routers, Switches, and Internetworking Protocols, Section 1.1, pp. 1-7, Addison Wesley longman, Inc. 1999.

(Continued)

*Primary Examiner*—Ricky Ngo
*Assistant Examiner*—DeWanda Samuel
(74) *Attorney, Agent, or Firm*—Cesari and McKenna, LLP

(57) ABSTRACT

A technique efficiently avoids transient routing disturbances in link state routing protocols with fragmented link state packets (LSPs) in a computer network. According to the novel technique, a link state router (LSR) specifies which of two or more links are to be advertised in each of two or more corresponding LSP fragments. The LSR advertises the states of the specified links in the corresponding LSP fragments to one or more other LSRs. In other words, each link of the LSR is assigned to a particular LSP fragment, and the state of the link is always to be advertised in that particular LSP fragment (i.e., no fragment wrapping). Upon receiving the LSP fragments, the other LSRs may update the correct link states based on the individual LSP fragments, i.e., without transient routing disturbances caused by fragment wrapping.

20 Claims, 5 Drawing Sheets

OTHER PUBLICATIONS

Callon, R., Network Working Group Request for Comments 1195, entitled Use of OSI IS-IS for Routing in TCP/IP and Dual Environments, pp. 1-80, Dec. 1990.

Moy, J., Network Working Group Request for Comments 2328, entitled OSPF Version 2, pp. 1-204, Apr. 1998.

* cited by examiner

TECHNIQUE FOR EFFICIENTLY AVOIDING TRANSIENT ROUTING DISTURBANCES IN LINK STATE ROUTING PROTOCOLS WITH LINK STATE PACKET FRAGMENTATION

BACKGROUND OF THE INVENTION

1. Field of the Invention

The present invention relates to computer networks and more particularly to efficiently avoiding transient routing disturbances in link state routing protocols with fragmented link state packets (LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or an area are generally referred to as a "domain," and a router that interconnects different domains together is generally referred to as a "border router."

Examples of an intradomain routing protocol, or an interior gateway protocol (IGP), are the Open Shortest Path First (OSPF) routing protocol and the Intermediate-System-to-Intermediate-System (IS-IS) routing protocol. IGPs may be used to perform routing within domains (ASes) by exchanging routing and reachability information among neighboring intradomain routers of the domains. An adjacency is a relationship formed between selected neighboring (peer) routers for the purpose of exchanging routing information messages and abstracting the network topology. The routing information exchanged by IGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses.

The OSPF and IS-IS protocols are based on link state technology and, therefore, are commonly referred to as link state routing protocols. Link state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

A router or, more generally, an intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link state protocol (e.g., IS-IS, or OSPF). Conventional link state protocols use link state packets (LSPs) for exchanging routing information between interconnected intermediate network nodes (IGP nodes). As used herein, an LSP (or an "IGP Advertisement") generally describes any message used by a link state IGP routing protocol for communicating routing information among interconnected IGP nodes, i.e., routers and switches (notably, link state routers, or "LSRs"). Operationally, a first IGP node may generate an LSP and "flood" (i.e., transmit) the packet over each of its network interfaces coupled to other IGP nodes. Thereafter, a second IGP node may receive the flooded LSP and update its routing table based on routing information contained in the received LSP.

Also, the second IGP node may flood the received LSP over one or more of its network interfaces, except for the interface at which the LSP was received. This flooding process may be repeated until each interconnected IGP node has received the LSP and updated its local routing table.

In practice, each IGP node typically generates and disseminates an LSP whose routing information includes "link states," e.g., a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the average time for a packet to reach the neighboring node, the amount of network traffic or available bandwidth over a communication link coupled to the neighboring node, etc.

As noted, LSPs are usually flooded until each IGP node has received an LSP from each of the other interconnected intermediate nodes, which LSP may be stored in a link state database (LSDB). Then, each of the IGP nodes can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Certain link state routing protocols, such as, e.g., IS-IS in particular, have a limited LSP size in which to advertise the link states of a pertinent network. As the size of the network grows, the ability to place all relevant link state information into an LSP becomes difficult. Accordingly, such link state routing protocols allow for LSP fragmentation, in which the LSP is fragmented or split into multiple smaller packets, each smaller packet (an "LSP fragment") containing a portion of the overall LSP's link state. Upon is receiving the LSP fragments, an IGP node (e.g., an LSR) uses the information contained within each fragment to create the network topology in its LSDB. Conventionally, each LSP fragment is assigned a fragment number (e.g., fragment 1, fragment 2, etc.) by the originating (advertising) LSR. Once an LSP fragment is received, the receiving LSR replaces the correspondingly numbered fragment with the newly received fragment to update its LSDB. In this way, LSP fragments may be received out of order (e.g., due to network delays, node processing, etc.) and updated accordingly.

One problem associated with LSP fragmentation, however, involves "movement" of link state information from one fragment into another. In other words, a link state that once appeared in a particular fragment may later appear in a different fragment. In particular, as link states change (e.g., links are added as "up" and/or links are removed as "down"), the amount of information that is fragmented within the LSP may also change.

For example, assume six link states, A-F, are to be advertised in an LSP, whose maximum fragment size (i.e., for fragments representing the LSP) may contain three link states each. Those skilled in the art will understand that the LSP may be fragmented accordingly, e.g., into a first fragment with links A, B, and C, and a second fragment with links D, E, and F, which may be advertised into the network. Further assume, for example, that after some time, link C fails (is down), and its state is removed from the LSP, i.e., from the first fragment. Because the first fragment now has two link states, the advertising LSR may move a link state from the second fragment (e.g., link D) to the first fragment (i.e., "fragment wrapping"). Now the first fragment advertises links A, B, and D, and the second fragment advertises links E and F. (Notably, fragment wrapping may also occur when link states are added, as will be understood by those skilled in the art.)

As mentioned above, LSP fragments may be received at an LSR at different times and out of order. As such, the receiving LSR may incorrectly conclude that a link state has been removed, when in fact is has actually only moved to another fragment. For instance, in the example above, in the event the receiving LSR receives, the updated second fragment (i.e., links E and F) prior to the updated first fragment (i.e., links A, B, and D), the receiving LSR may incorrectly update its LSDB to remove a state for link D because it no longer appears in the second fragment. Once the updated first fragment is eventually received, the receiving LSR adjusts its LSDB to correctly reflect that link C is down, and that link D is up.

The incorrect updates to the LSDB may cause transient (or temporary) routing disturbances, such as black holes, microloops, or other incorrect routing and associated problems, as will be understood by those skilled in the art. While these disturbances may be short-lived (e.g., sub-second), a goal of network administrators is to achieve the fastest possible network convergence (e.g., less than 100 milliseconds). It is imperative, then, that receiving LSRs update the correct link state information into their LSDBs in order to ensure fast and proper network convergence. There remains a need, therefore, for a technique that avoids transient routing disturbances by efficiently preventing fragment wrapping, thus allowing other LSRs to receive LSP fragments out of order and deterministically conclude link states of the network without incorrectly updating (e.g., removing) a link state.

SUMMARY OF THE INVENTION

The present invention is directed to a technique for efficiently avoiding transient routing disturbances in link state routing protocols with fragmented link state packets (LSPs) in a computer network. According to the novel technique, a link state router (LSR) specifies which of two or more links are to be advertised in each of two or more corresponding LSP fragments. The LSR advertises states of the specified links in the corresponding LSP fragments to one or more other LSRs. In other words, each link of the LSR is assigned to a particular LSP fragment, and the state of the link is illustratively advertised in that particular LSP fragment (i.e., no fragment wrapping). Upon receiving the LSP fragments, the other LSRs may accurately update the correct link states based on the individual LSP fragments, i.e., without transient routing disturbances caused by fragment wrapping.

Advantageously, the novel technique efficiently avoids transient routing disturbances in link state routing protocols with fragmented LSPs in a computer network. By is specifying the particular LSP fragment to which each link of an LSR is to be advertised, the novel technique allows other LSRs receiving fragmented LSPs to deterministically conclude the state of the links from the advertising LSR. In particular, the present invention avoids transient routing disturbances (e.g., black holes) by efficiently preventing fragment wrapping, thus allowing other LSRs to receive LSP fragments out of order without incorrectly updating (e.g., removing) a link state.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
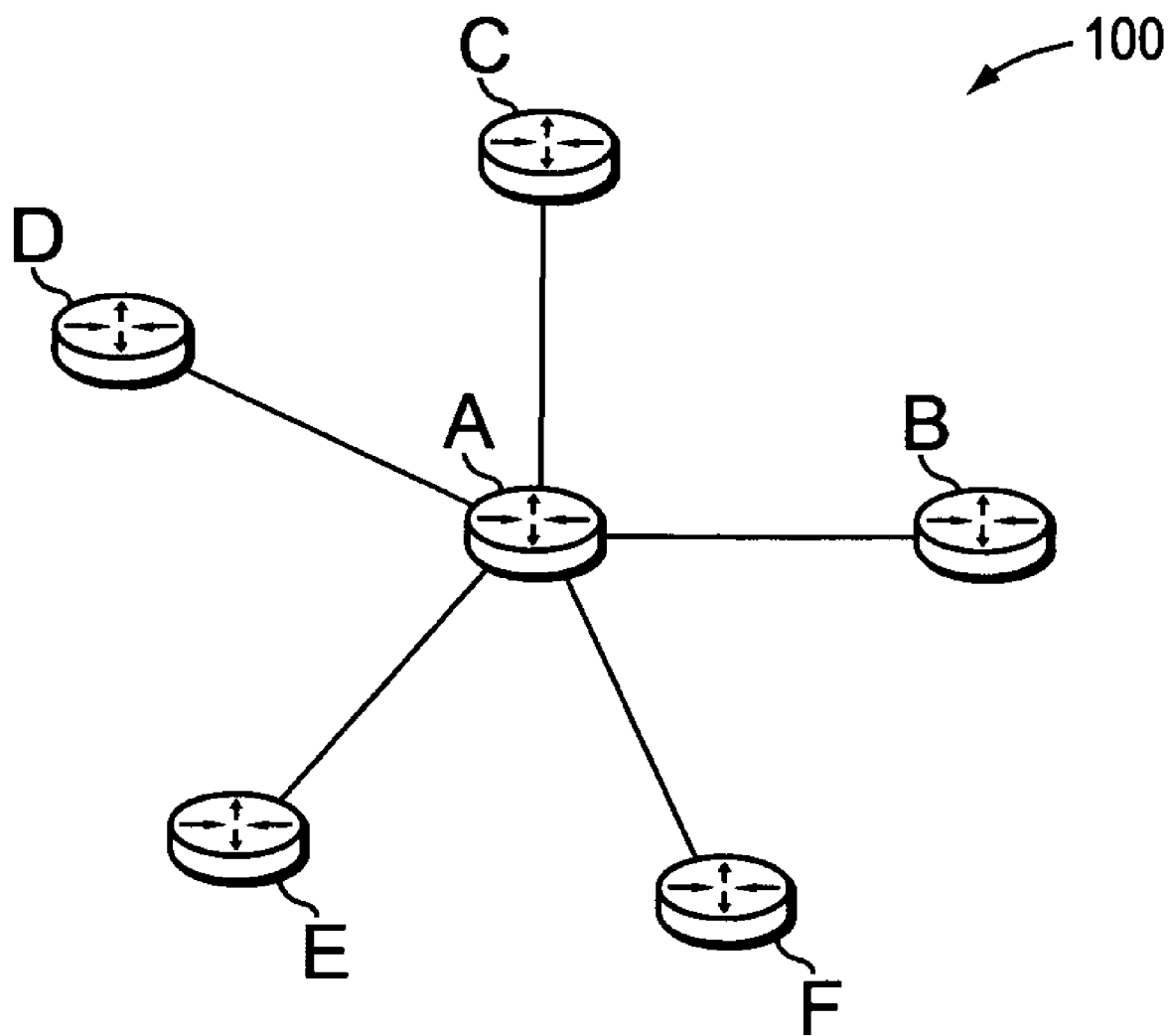
FIG. 1 is a schematic block diagram of an exemplary computer network that may be used in accordance with the present invention.

FIG. 1 is a schematic block diagram of an exemplary computer network 100 that may be advantageously used with the present invention. The network 100 comprises a plurality of interconnected network nodes, such as Routers A-F. Illustratively, the routers may be interconnected by one or more links, such as, e.g., over local area network (LAN) links, wireless LANs, etc., to form the network 100. As used herein, the links connecting the routers are referred to as the router to which the link connects. For example, from Router A, Router C may be reached via Link C. Conversely, from Router C, Router A may be reached via Link A. Each router may be used to reach one or more destination address prefixes and may be interconnected to one or more other routers, not shown. Those skilled in the art will understand that any number of nodes, routers, links, etc., may be used in the computer network 100 and connected in a variety of ways, and that the view shown herein is for simplicity. For instance, while each router is shown connected to Router A, those skilled in the art will understand that the routers may each be interconnected to the others (e.g., in a full-mesh fashion) or to some of the others (e.g., in a partial-mesh fashion), and that the connections as shown are for illustrative purposes as used below.

Data packets may be exchanged among the routers of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link state protocols, through the use of link state advertisements or link state packets (LSPs) as described further below. Notably, a router that communicates using link state routing protocols may be referred to herein as a link state router (LSR).

Figure 2:
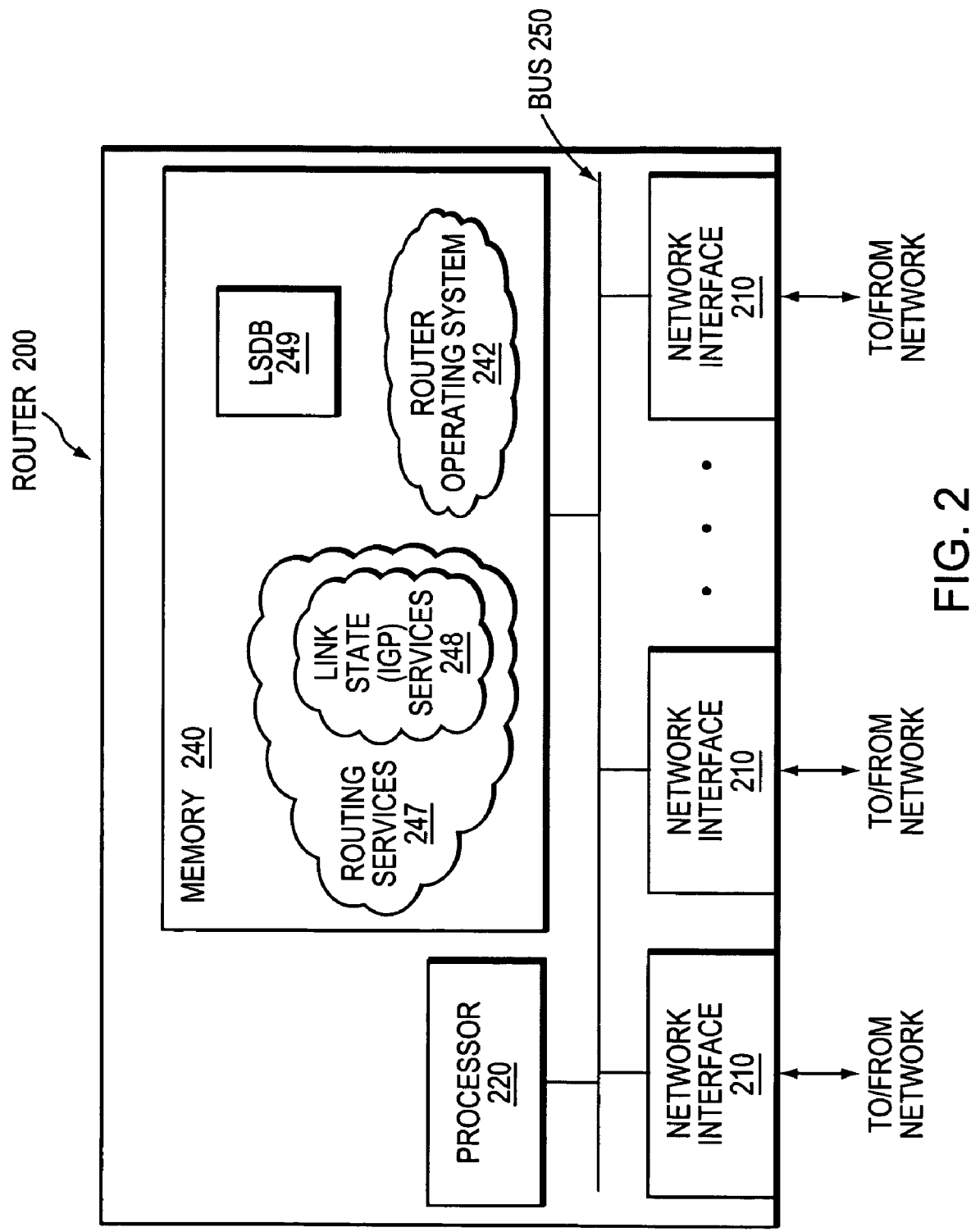
FIG. 2 is schematic block diagram of an exemplary router that may be advantageously used with the present invention.

FIG. 2 is a schematic block diagram of an exemplary node 200, which is illustratively a router (e.g., an LSR) that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, RSVP, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as link state database (LSDB) 249. A router operating system 242 (e.g., the Internetworking Operating System, or IOSTM, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247 and link state (IGP) services or process 248. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as various link state (IGP) routing protocols, e.g., IS-IS, (as link state services 248), etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

Changes in the network topology may be communicated among routers 200 using a link state protocol, such as the conventional IS-IS protocol. Suppose, for example, that a communication link fails within a network or a cost value associated with a network node changes. Once the change in the network's state is detected by one of the routers, that router may flood an IGP Advertisement communicating the change to the other routers in the network (e.g., the broadcast network). In this manner, each of the routers eventually "converges" to an identical view of the network topology.

Figure 3:
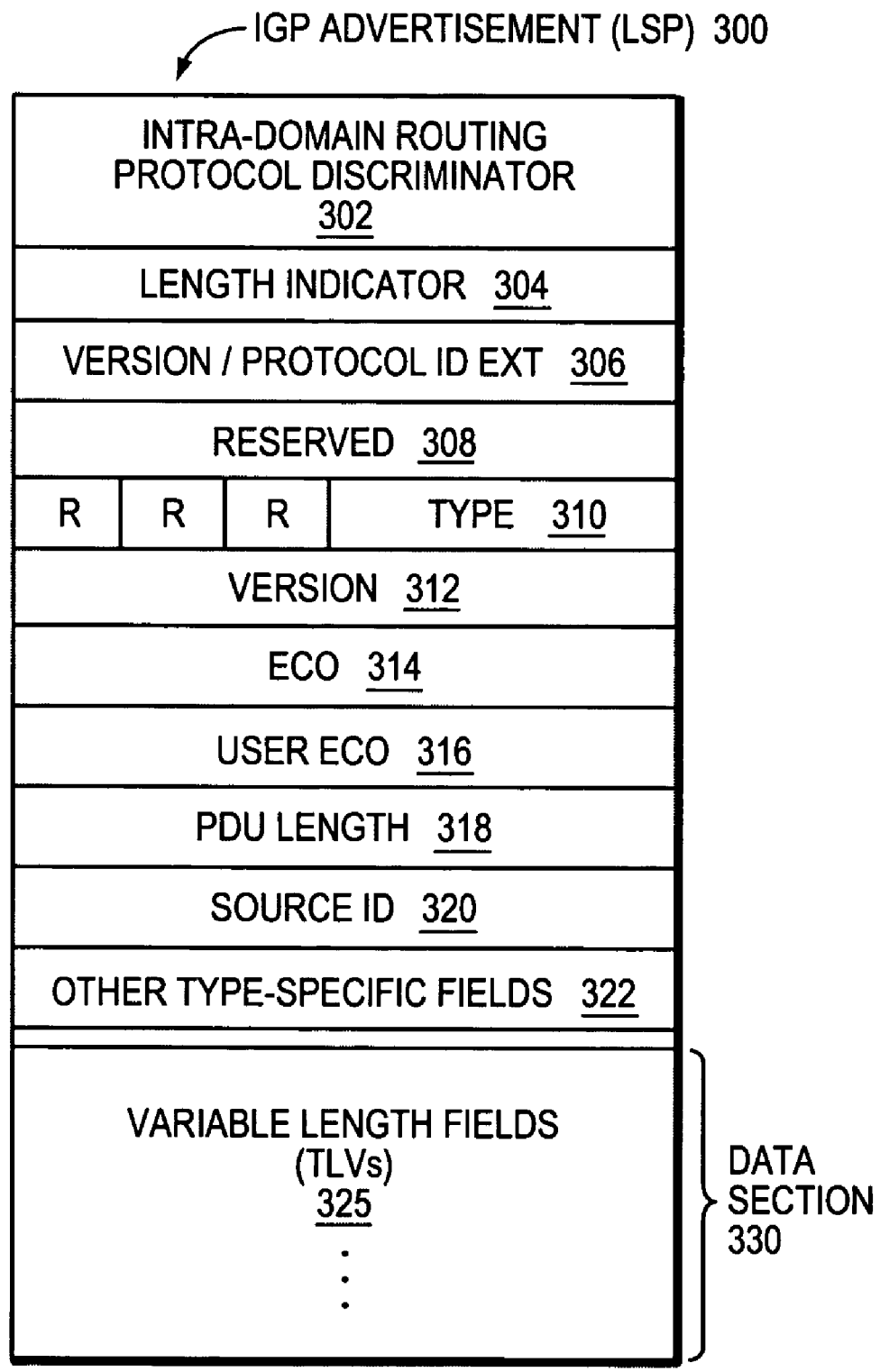
FIG. 3 is a schematic block diagram of an exemplary LSP that may be transmitted by the routers.

FIG. 3 illustrates an exemplary IGP Advertisement (LSP) 300 that may be flooded by the routers 200, (e.g., an IS-IS LSP). The packet includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of LSP 300 being transmitted, which may define the existence of other type-specific fields 322 within the LSP. For example, the type of advertisement may be a "Hello" packet, an LSP, etc., as will be understood by those skilled in the art. The PDU length field 318 stores a value indicating the length of the entire PDU (Protocol Data Unit, or LSP 300), including the header, type-specific fields, and data fields. A source ID field 320 stores a value that identifies the router that generated and originally broadcast the LSP 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the LSP. Typically, the sequence number stored in the field is-incremented, e.g., by one, for every new version of the LSP. The LSP 300 is therefore considered "stale" (invalid) if its sequence number is less than the sequence number stored in a previously-received version of the LSP, i.e., generated by the same advertising node. Accordingly, the routers 200 may be configured to store and forward only the most recent version of an LSP, e.g., the version having the largest sequence number. A remaining lifetime field (not shown) may also be used to store a value that may be used for determining whether the LSP 300 is valid. The remaining lifetime value is typically initialized to a non-zero integer value, often in units of seconds. The remaining lifetime value may be decremented, e.g., by one every second, until the remaining lifetime value reaches zero, thereby indicating that the LSP has become invalid. That is, every router 200 that stores or floods the LSP 300 continuously ages the packet until the remaining lifetime value equals zero. Those skilled in the art will appreciate that other aging mechanisms alternatively may be used, such as incrementing the LSP remaining lifetime value from an initial value, e.g., equal to zero, until the remaining lifetime value reaches a known upper limit.

The data section 330 includes one or more variable length fields 325, which each have a specific type (or code), length, and value (TLV) as will be understood by those skilled in the art. For example, to advertise network topology, one or more pairs of neighboring-node fields (not shown) and cost fields (not shown) may be used (e.g., a "link state"). The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 325 of the LSP 300, such as checksum values, padding fields, proprietary fields, etc. Generally, the received LSPs are stored in LSDB 249 of the router 200. As mentioned above, LSP 300 may be separated (fragmented) into two or more LSP fragments, as will be understood by those skilled in the art. Accordingly, a receiving LSR updates LSP fragments as new corresponding LSP fragments are received ("fragment replacement").

The present invention is directed to a technique for efficiently avoiding transient routing disturbances in link state routing protocols with fragmented LSPs in a computer network. According to the novel technique, an LSR specifies which of two or more links are to be advertised in each of two or more corresponding LSP fragments. The LSR advertises the states of the specified links in the corresponding LSP fragments to one or more other LSRs. In other words, each link of the LSR is assigned to a particular LSP fragment, and the state of the link is illustratively advertised in that particular LSP fragment (i.e., no fragment wrapping). Upon receiving the LSP fragments, the other LSRs may accurately update the correct link states based on the individual LSP fragments, i.e., without transient routing disturbances caused by fragment wrapping.

Figure 4A:
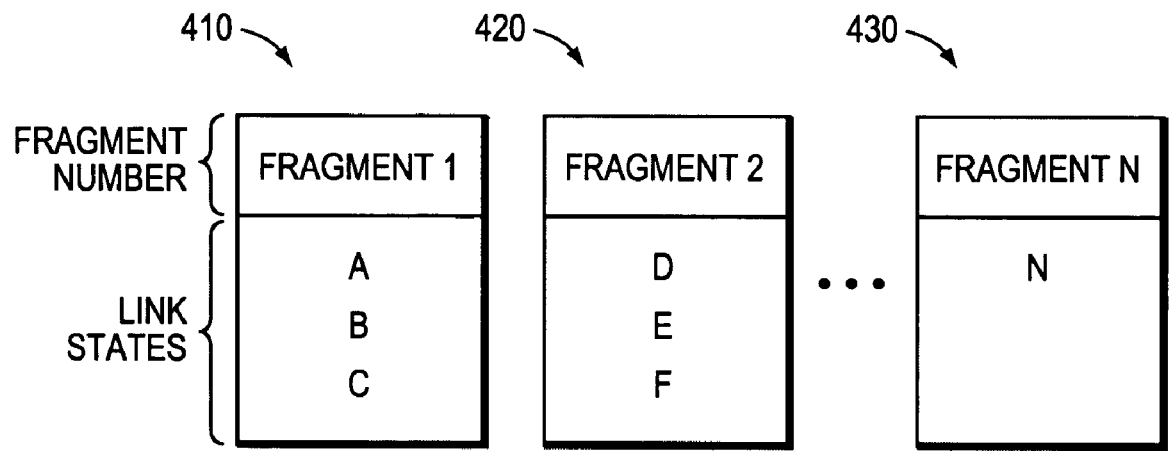
FIGS. 4A and 4B are schematic block diagrams of an illustrative fragmented LSP that may be advantageously used in accordance with the present invention.

In accordance with the present invention, positions (e.g., space, locations, etc.) within an LSP 300 (i.e., each LSP fragment) are pre-allocated to any and all particular links of an LSR for which that LSR may advertise link state information. For instance, a system administrator may configure static locations (i.e., unchanging) within particular LSP fragments for each link of the LSR. Assume that the advertising LSR is LSR A of FIG. 1 above, and that Links A-F (as shown) are to be placed in particular fragments. FIG. 4A is a schematic block diagram of an illustrative fragmented LSP that may be advantageously used in accordance with the present invention. Each fragment of the LSP may comprise, e.g., a fragment number field and a link state (information/data) field. Illustratively, Links A-C have been assigned to "Fragment 1" (410), and Links D-F have been assigned to "Fragment 2" (420). Notably, other links (e.g., Links N, not shown) may also implement the link state routing protocol, and such links are also assigned to locations within particular LSP fragments (e.g., "Fragment N," 430). Moreover, those skilled in the art will understand that each link generally only has one state that is assigned a location, since conventionally only one neighbor is reached over a single link. (In the event more than one neighbor may be reached over a single link, a single "pseudo neighbor" may be used that represents the link itself, as will also be understood.) Further, as used herein, the state of a link may refer to any state, such as, e.g., a neighbor state, a state of routable addresses via the link, prefixes reachable via the link, etc.; thus "link state" may generally be used to represent states other than that of the link (e.g., up or down).

Once the links of an LSR are each assigned to a particular LSP fragment, states of those links are placed in the same corresponding fragment. That is, when the state of the link is present (e.g., the link is up), the link is placed in the corresponding fragment. For instance, if Links A-C are up, they are placed within Fragment 1, and if Links D-F are up, they are placed within Fragment 2. Assuming each of the links A-F is functioning (up), the LSP Fragments 1 and 2 (e.g., and up to N) may thus be advertised by LSR A as shown in FIG. 4A. Notably, the links within a particular fragment may or may not necessarily be in the same order in accordance with the present invention. For example, Fragment 1 may be configured to contain Links A, B, and C, but the order may be something other than A-B-C (e.g., A-C-B, etc.). Because of the LSR characteristic for fragment replacement, the order of the information within the fragments may vary (i.e., so long as the same link states remain in the same fragments, in accordance with the present invention).

Figure 4B:
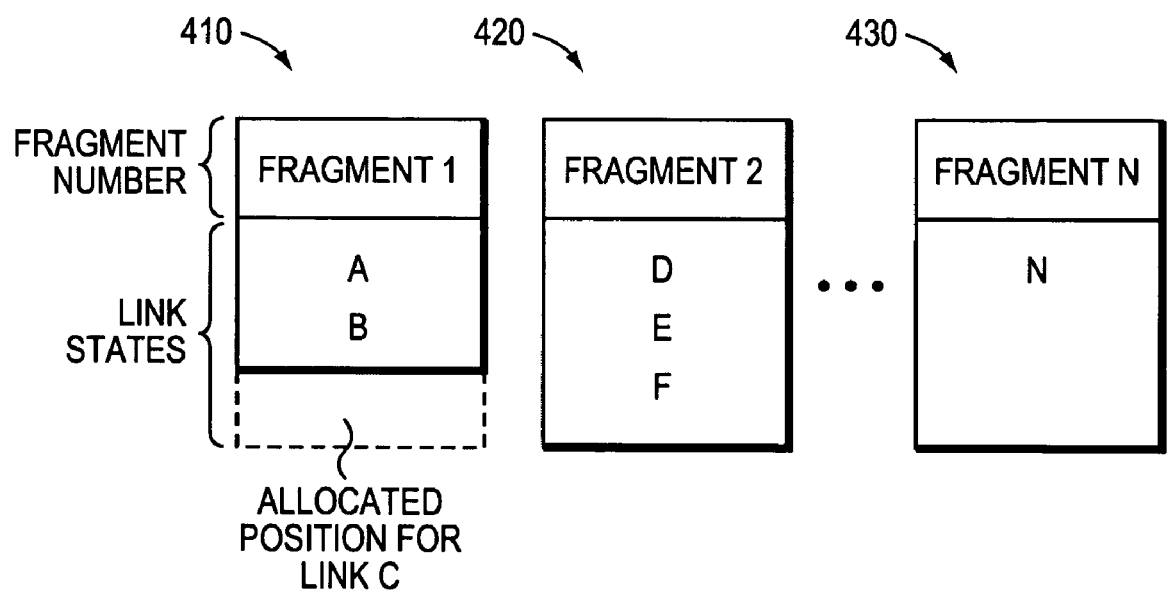

In the event a link state is assigned to a particular LSP fragment, but the link is not functioning (e.g., is down), the present invention specifically does not "wrap" links from other fragments to fill the place of the non-functioning link. FIG. 4B is a schematic block diagram of the illustrative fragmented LSP of FIG. 4A where a link (e.g., Link C) is down. A non-functioning link (e.g., Link C) may be illustratively represented in the LSP fragments by simply not including the link state in the LSP fragment (i.e., the fragment is "shorter," as indicated by the solid lines) of Fragment 1 (410) is FIG. 4B. Alternatively, the present invention may also include a reserved space (e.g., a blank/padded TLV) within the LSP fragment or an indication that the link is down (both indicated by the dashed lines for the position allocated for Link C). The indication that the link is down may take the form of one or more flags/bits/codes/etc. that indicate that the state of the associated link (i.e., still included within the fragment) is down (or is generally not to be used), or as a maximum metric value (e.g., max cost, etc.) so that the link is not used, as will be understood by those skilled in the art.

As an illustrative example, assume that all specified links of an advertising LSR, e.g., Links A-F of LSR A, are initially up. As such, a state may be initially contained within the LSP 300 for each link, e.g., A-C in Fragment 1 and D-F in Fragment 2 as in FIG. 4A. A receiving LSR, e.g., LSR B, receives the LSP (i.e., the fragments), and updates its LSDB 249 to contain states for each link from LSR A, namely Links A-F. Assume further that after some time, Link C becomes inoperative, e.g., due to failure, removal, etc. The advertising LSR (LSR A) may remove the state of Link C from Fragment 1 in accordance with the present invention as described above. Regardless of whether any of Links A-F are up or down, the Links A-C are only advertised in Fragment 1, and Links D-F are only advertised in Fragment 2. Accordingly, Fragment 2 remains the same as before, having Links D-F. In this manner, should the receiving LSR (LSR B) receive Fragment 2 prior to the updated Fragment 1, Links D-F would remain, and the states of the links are unchanged at the receiving LSR. Again, because the receiving LSR only updates link state information based on the fragment number (e.g., fragment replacement of Fragment 2), and because the present invention obviates fragment wrapping, the receiving LSR accurately updates the correct link states. When the receiving LSR later receives the updated Fragment 1 without Link C (or other indication as being down), the receiving LSR may then deterministically conclude that Link C is down, and remove it from its LSDB 249. Thus, by preventing fragment wrapping (e.g., of Link D into Fragment 1), the present invention avoids incorrect link state updates and possible transient routing disturbances, as mentioned above.

The present invention may also reserve locations for links that are not functioning at the time of configuration. In this manner, the present invention allows for "forward references" to links/interfaces that may be added/initialized in the future, such as for network expansion, repairs, etc. For instance, assume that a Link "G" is not yet functioning at LSR A. A system administrator may still assign a particular LSP fragment to Link G (e.g., Fragment N), such that when Link G becomes operational (e.g., is added, repaired, etc.), the link will have an allocated position within the LSP.

While the positions of the links within the LSP fragments are to remain generally static in accordance with the present invention, it is also possible to occasionally reoptimize the placement of the links within the LSP fragments. For example, it may be beneficial to change the placement of the links when more links are added, more links are removed (e.g., permanently), or to optimize fragment usage utilization, etc. In other words, the present invention does not prohibit the re-configuration of the static link locations within the LSP fragments, but prohibits dynamically changing the static locations (fragment wrapping) as link states change during normal network operations. Those skilled in the art will understand that re-configuration may result in possible transient routing disturbances as the LSP fragments with newly configured static placements propagate through the network to replace the previous static placements. However, this "one-shot" possible disturbance may be considered acceptable in the minimal instances where it may occur (e.g., during manual network reconfiguration, etc.).

Figure 5:
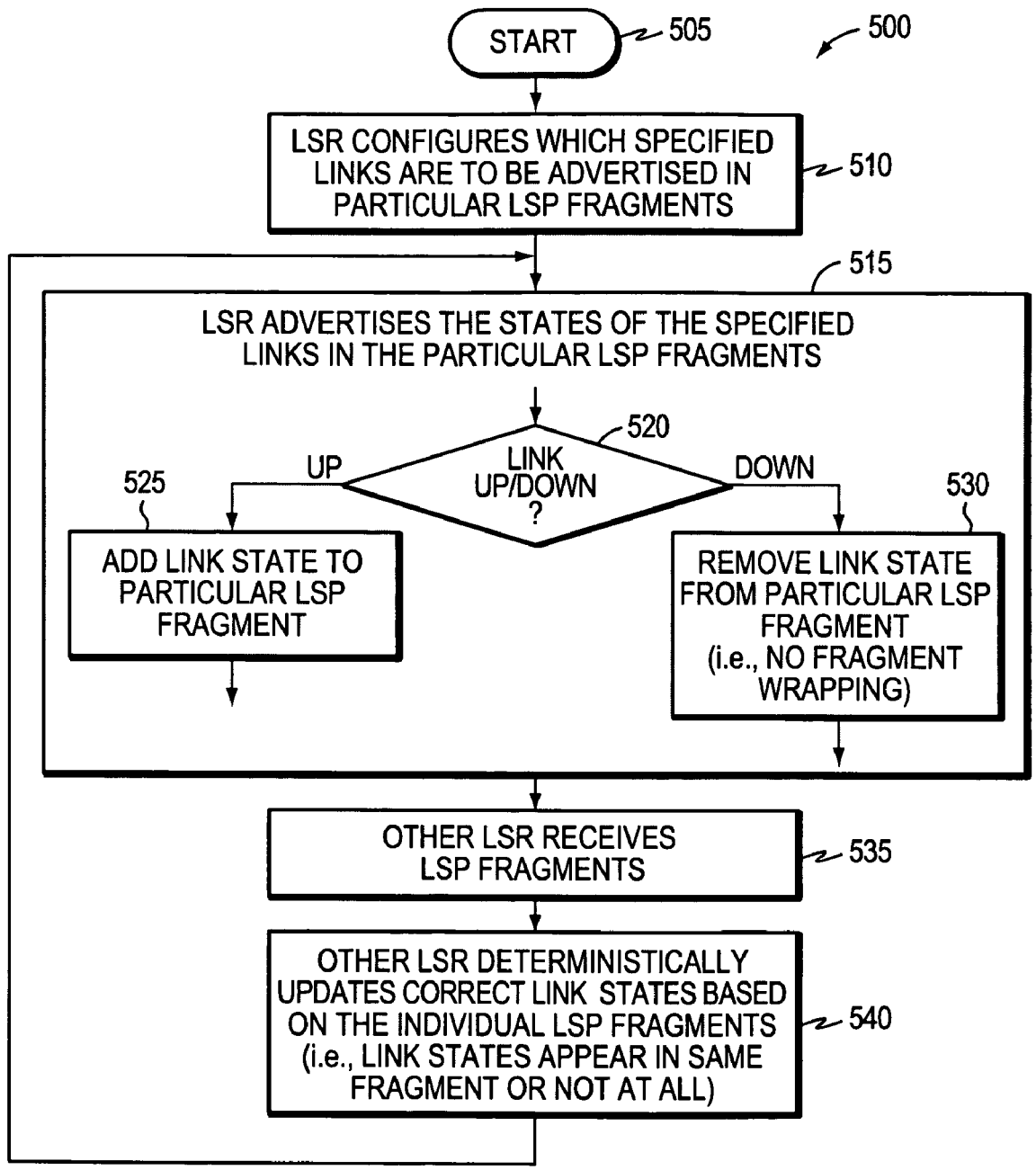
FIG. 5 is a flowchart illustrating a procedure for efficiently avoiding transient routing disturbances in link state routing protocols with fragmented LSPs in accordance with the present invention.

FIG. 5 is a flowchart illustrating a procedure for efficiently avoiding transient routing disturbances in link state routing protocols with fragmented LSPs in accordance with the present invention. The procedure 500 starts at step 505, and continues to step 510, where an LSR (e.g., LSR A) configures which specified links are to be advertised in particular LSP fragments (e.g., Fragments 1-N). For instance, according to the example above, Links A-C are pre-allocated to Fragment 1, while Links D-F are pre-allocated to Fragment 2. In step 515, the LSR advertises the states of the specified links in the particular corresponding LSP fragments. Specifically, the LSR determines the state of each link (e.g. whether each link is up or down) in sub-step 520. If the link is up, the LSR adds the link state to the particular LSP fragment in sub-step 525. If, on the other hand, the link is down, the LSP removes the link state from the particular LSP fragment in substep 530. As mentioned above, "removing" the link state may also imply inserting padding, setting flags, changing metrics, etc., in order to indicate that the link is down. Notably, the manner in which sub-step 530 is completed supports the present invention to ensure that no fragment wrapping occurs with link states of other LSP fragments accordingly.

Once the LSR advertises the link states (e.g., in fragments of LSP 300) in step 515, one or more other LSRs (e.g., LSR B) may receive the LSP fragments in step 535. In step 540, the other receiving LSR then deterministically updates the correct link states (e.g., into LSDB 249) based on each individual LSP fragment received. As described above, this certainty is due to the appearance or non-appearance of particular link states within the same fragment in accordance with the present invention. The procedure 500 may continuously cycle to step 515, where the advertising LSR (LSR A) updates and advertises LSPs in fragments. For instance, as link states change (e.g., go up or down), the advertising router updates the LSP (i.e., the fragments) accordingly, and each link remains advertised (or not) in a particular fragment (i.e., no fragment wrapping). This way, when the receiving LSR receives a fragment in step 535, the proper updates will be completed based on fragment replacement in step 540, as described above.

Advantageously, the novel technique efficiently avoids transient routing disturbances in link state routing protocols with fragmented LSPs in a computer network. By specifying the particular LSP fragment to which each link of an LSR is to be advertised, the novel technique allows other LSRs receiving fragmented LSPs to deterministically conclude the state of the links from the advertising LSR. In particular, the present invention avoids transient routing disturbances (e.g., black holes) by efficiently preventing fragment wrapping, thus allowing other LSRs to receive LSP fragments out of order without incorrectly updating (e.g., removing) a link state.

Those skilled in the art will understand that the present invention also advantageously applies to graceful restarts, since link placement (LSP fragment configuration) remains the same as before the restart, thus avoiding transient routing disturbances upon graceful restart. Also, algorithms that perform difference calculations on the entire LSP (i.e., all fragments), as will also be understood by those skilled in the art, may also benefit from the present invention to optimize convergence. For instance, the LSR performing the difference calculation may become confused if links states move among fragments until all the fragments have been received.

While there has been shown and described an illustrative embodiment that efficiently avoids transient routing disturbances in link state routing protocols with fragmented LSPs in a computer network, it is to be understood that various other adaptations and modifications may be made within the spirit and scope of the present invention. For example, the invention has been shown and described herein using IS-IS as the link state routing protocol. However, the invention in its broader sense is not so limited, and may, in fact, be used with other routing protocols that fragment advertisements (e.g., LSPs), as will be understood by those skilled in the art. Also, while the above description describes configuring the link locations with LSP fragments manually by a system administrator, those skilled in the art will understand that various processes operating on the advertising LSR may dynamically configure the link locations. For instance, upon automatic discovery of links, the LSR may assign certain positions to particular links, which are not altered due to subsequent state changes of the links (i.e., no fragment wrapping).

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently avoiding transient routing disturbances in one or more link state routing protocols with fragmented link state packets (LSPs) in a computer network, the method comprising:
   specifying, at a first link state router (LSR), which of two or more links are to be advertised in each of two or more corresponding LSP fragments; and
   advertising states of the specified links in the corresponding LSP fragments from the first LSR to one or more other LSRs, by
      adding a state of one of the specified links to a corresponding LSP fragment when the specified link is up, and
      removing a state of one of the specified links from a corresponding LSP fragment when the specified link is down, wherein the removing a state is performed by a technique selected from a group consisting of: replacing the state with a reserved space in the corresponding LSP fragment, replacing the state with a specified padding in the corresponding LSP fragment, changing the state to specifically indicate that the link is down, changing one or more metrics within the state to indicate that the link is not to be used, setting one or more flags to specifically indicate that the link is down, and setting the one or more flags to indicate that the link is not to be used,
   wherein states of other specified links remain in their corresponding LSP fragments regardless of the addition or removal of states of specified links.

2. The method as in claim 1, further comprising:
   receiving the LSP fragments at a receiving LSR of the one or more other LSRs; and
   updating correct link states at the receiving LSR based on the individual LSP fragments.

3. The method as in claim 1, further comprising:
   re-configuring, at the first LSR, which specified links are to be advertised in each of the corresponding LSP fragments.

4. The method as in claim 1, wherein the step of specifying is performed either manually by a system administrator of the LSR or dynamically by the LSR.

5. The method as in claim 1, wherein one or more of the two or more links are forward referenced links.

6. The method as in claim 1, wherein the states of the specified links represent states selected from a group comprising: link states; neighbor states; routable addresses; and reachable prefixes.

7. The method as in claim 1, wherein the link state routing protocol is the Intermediate-System-to-Intermediate-System (IS-IS) protocol.

8. An apparatus for efficiently avoiding transient routing disturbances in one or more link state routing protocols with fragmented link state packets (LSPs) in a computer network, the apparatus comprising:
   means for specifying, at the apparatus, which of two or more links are to be advertised in each of two or more corresponding LSP fragments; and
   means for advertising states of the specified links in the corresponding LSP fragments, the means for advertising including
      means for adding a state of one of the specified links to a corresponding LSP fragment when the specified link is up, and
      means for removing a state of one of the specified links from a corresponding LSP fragment when the specified link is down, by a technique selected from a group consisting of: replacing the state with a reserved space in the corresponding LSP fragment, replacing the state with a specified padding in the corresponding LSP fragment, changing the state to specifically indicate that the link is down, changing one or more metrics within the state to indicate that the link is not to be used, setting one or more flags to specifically indicate that the link is down, and setting the one or more flags to indicate that the link is not to be used,
   wherein states of other specified links remain in their corresponding LSP fragments regardless of the addition or removal of states of specified links.

9. A link state router (LSR) configured to efficiently avoid transient routing disturbances in one or more link state routing protocols with fragmented link state packets (LSPs) in a computer network, the LSR comprising:
   two or more network interfaces (links) configured to send and receive LSP fragments;
   a processor coupled to the two or more network interfaces and configured to execute a link state process; and
   a memory configured to store the link state process executable by the processor, the link state process configured to
   i) configure which specified links of the two or more links are to be advertised in each of two or more corresponding LSP fragments,
   ii) advertise states of the specified links in the corresponding LSP fragments to one or more other LSRs, by
      addition of a state of one of the specified links to a corresponding LSP fragment when the specified link is up, and
      removal of a state of one of the specified links from a corresponding LSP fragment when the specified link is down, by a technique selected from a group consisting of: replacement of the state with a reserved space in the corresponding LSP fragment, replacement of the state with a specified padding in the corresponding LSP fragment, change of the state to specifically indicate that the link is down, change of one or more metrics within the state to indicate that the link is not to be used, setting of one or more flags to specifically indicate that the link is down, and setting of the one or more flags to indicate that the link is not to be used, wherein states of other specified links remain in their corresponding LSP fragments regardless of the addition or removal of states of specified links.

10. A method for preventing fragment wrapping in one or more link state routing protocols with fragmented link state packets (LSPs) in a computer network, the method comprising:

assigning each link of a link state router (LSR) to a particular LSP fragment; and advertising, by the LSR, a state of each link only in the particular LSP fragment to which the link is assigned, by adding a state of one of the assigned links to a corresponding LSP fragment when the assigned link is up, and removing a state of one of the assigned links from a corresponding LSP fragment when the assigned link is down, wherein removing the state is by a technique selected from a group consisting of: replacing the state with a reserved space in the corresponding LSP fragment, replacing the state with a specified padding in the corresponding LSP fragment, changing the state to specifically indicate that the link is down, changing one or more metrics within the state to indicate that the link is not to be used, setting one or more flags to specifically indicate that the link is down, and setting the one or more flags to indicate that the link is not to be used, wherein states of other assigned links remain in their corresponding LSP fragments regardless of the addition or removal of states of assigned links.

11. The method as in claim 10, further comprising:
receiving the LSP fragments at a receiving LSR of the one or more other LSRs; and
updating correct link states at the receiving LSR based on the individual LSP fragments.

12. The method as in claim 10, further comprising:
re-configuring, at the LSR, which assigned links are to be advertised in each of the corresponding LSP fragments.

13. The method as in claim 10, wherein assigning is performed either manually by a system administrator of the LSR or dynamically by the LSR.

14. The method as in claim 10, wherein the states of the assigned links represent states selected from a group comprising: link states; neighbor states; routable addresses; and reachable prefixes.

15. A system for efficiently avoiding transient routing disturbances in one or more link state routing protocols with fragmented link state packets (LSPs) in a computer network, the system comprising:

a first link state router (LSR) configured to specify which of two or more links are to be advertised in each of two or more corresponding LSP fragments, advertise states of the specified links in the corresponding LSP fragments, by addition of a state of one of the specified links to a corresponding LSP fragment when the specified link is up, and removal of a state of one of the specified links from a corresponding LSP fragment when the specified link is down, wherein the removal of a state is performed by a technique selected from a group consisting of: replacement of the state with a reserved space in the corresponding LSP fragment, replacement of the state with a specified padding in the corresponding LSP fragment, change of the state to specifically indicate that the link is down; change of one or more metrics within the state to indicate that the link is not to be used, use of one or more flags to specifically indicate that the link is down, and use of the one or more flags to indicate that the link is not to be used, wherein states of other specified links remain in their corresponding LSP fragments regardless of the addition or removal of states of specified links; and one or more other LSRs configured to receive the LSP fragments.

16. The system as in claim 15, wherein the one or more other LSRs are further configured to update correct link states based on the individual LSP fragments.

17. A method comprising:
determining, at a first link state router (LSR), which of two or more links are to be advertised in each of two or more corresponding link state packets (LSP) fragments;
adding a state of one of the specified links to a corresponding LSP fragment when the specified link is up;
including an indication that one of the specified links is down in a corresponding LSP fragment when the specified link is down, by replacing a state of the specified link with a reserved space in the corresponding LSP fragment, replacing the state of the specified link with a specified padding in the corresponding LSP fragment, changing the state of the specified link to specifically indicate that the link is down, changing one or more metrics within the state of the specified link to indicate that the link is not to be used, setting one or more flags to specifically indicate that the link specified link is down, or setting the one or more flags to indicate that the specified link is not to be used; and
maintaining states of other specified links in their corresponding LSP fragments regardless of the addition of states when up or inclusion of indications when down for specified links.

18. The method as in claim 17, further comprising:
receiving the LSP fragments at a receiving LSR of the one or more other LSRs; and
updating link states at the receiving LSR based on the individual LSP fragments.

19. The method as in claim 17, further comprising:
re-configuring, at the first LSR, which specified links are to be advertised in each of the corresponding LSP fragments.

20. The method as in claim 17, wherein one or more of the two or more links are forward referenced links.

* * * * *

UNITED STATES PATENT AND TRADEMARK OFFICE
CERTIFICATE OF CORRECTION

| | | |
|---|---|---|
| PATENT NO. | : 7,751,336 B2 | |
| APPLICATION NO. | : 11/449282 | |
| DATED | : July 6, 2010 | |
| INVENTOR(S) | : Christian Hopps | |

It is certified that error appears in the above-identified patent and that said Letters Patent is hereby corrected as shown below:

Col. 3, Line 46, replace "Upon is receiving" with "Upon receiving"

Col. 4, Line 62, replace "By is specify-" with "By specify-"

Signed and Sealed this
Fifth Day of April, 2011

David J. Kappos
*Director of the United States Patent and Trademark Office*